(12) United States Patent
Nerdrum (10) Patent No.: US 10,677,369 B2
(45) Date of Patent: Jun. 9, 2020

(54) TEMPERATURE CALIBRATION SYSTEM COMPRISING A VALVE IN A CLOSED FLUIDIC SYSTEM

(71) Applicant: Fluke Corporation, Everett, WA (US)

(72) Inventor: Eric Nerdrum, Kaysville, UT (US)

(73) Assignee: Fluke Corporation, Everett, WA (US)

( * ) Notice: Subject to any disclaimer, the term of this patent is extended or adjusted under 35 U.S.C. 154(b) by 141 days.

(21) Appl. No.: 15/668,417

(22) Filed: Aug. 3, 2017

(65) Prior Publication Data

US 2019/0040969 A1 Feb. 7, 2019

(51) Int. Cl.
| | |
|---|---|
| *F16K 31/00* | (2006.01) |
| *G01K 15/00* | (2006.01) |
| *F28D 15/02* | (2006.01) |
| *F28D 15/06* | (2006.01) |

(52) U.S. Cl.
CPC .......... *F16K 31/002* (2013.01); *G01K 15/005* (2013.01); *F28D 15/0266* (2013.01); *F28D 15/0275* (2013.01); *F28D 15/0283* (2013.01); *F28D 15/06* (2013.01); *F28F 2255/04* (2013.01); *F28F 2265/10* (2013.01)

(58) Field of Classification Search
None
See application file for complete search history.

(56) References Cited

U.S. PATENT DOCUMENTS

| | | | | |
|---|---|---|---|---|
| 6,287,102 | B1 * | 9/2001 | Franz | B29C 48/09 425/71 |
| 6,390,668 | B1 | 5/2002 | Materna | |
| 7,909,504 | B2 | 3/2011 | Sjogren et al. | |
| 8,342,742 | B2 | 1/2013 | Harslund et al. | |
| 9,897,365 | B2 * | 2/2018 | Lee | F25D 11/025 |
| 10,203,164 | B2 * | 2/2019 | Olsen | F24S 80/20 |
| 2001/0037880 | A1 * | 11/2001 | Solondz | F28D 15/06 165/274 |
| 2005/0172644 | A1 | 8/2005 | Zhang et al. | |
| 2006/0231235 | A1 * | 10/2006 | Yamanaka | F01N 5/02 165/51 |

(Continued)

FOREIGN PATENT DOCUMENTS

| | | |
|---|---|---|
| FR | 2 923 604 A1 | 5/2009 |
| WO | 2008/034442 A2 | 3/2008 |

OTHER PUBLICATIONS

Extended European Search Report, dated Dec. 4, 2018, for European Application No. 18187207.8-1008, 5 pages.

*Primary Examiner* — Henry T Crenshaw
(74) *Attorney, Agent, or Firm* — Seed Intellectual Property Law Group LLP (57) ABSTRACT

Embodiments are directed to a temperature calibration system that includes a closed fluidic system, such as a thermosiphon or a heat pipe. The closed fluidic system includes a valve for fluidly separating components therein from each other. In one embodiment, the closed fluidic system is a thermosiphon (or a heat pipe) and the valve is configured, in a closed state, to cover a port of the condenser to fluidly separate the condenser from other components of the thermosiphon. The valve may be a passively activated valve or an electrically actuated valve. In some embodiments, the valve is thermally actuated such that the valve changes state in response to changes in temperature.

24 Claims, 8 Drawing Sheets

(56) References Cited

U.S. PATENT DOCUMENTS

| | | | |
|---|---|---|---|
| 2007/0163754 A1* | 7/2007 | Dionne | F28D 15/0266 |
| | | | 165/104.21 |
| 2008/0011458 A1* | 1/2008 | Miyagawa | F01N 5/02 |
| | | | 165/104.21 |
| 2009/0067475 A1 | 3/2009 | Tavener | |
| 2010/0101753 A1* | 4/2010 | Harslund | F25D 19/006 |
| | | | 165/11.1 |
| 2010/0116265 A1* | 5/2010 | Williamson | F24S 10/90 |
| | | | 126/643 |
| 2014/0241134 A1* | 8/2014 | Niwa | G04B 17/22 |
| | | | 368/127 |
| 2017/0089645 A1* | 3/2017 | Sharp | F28D 15/02 |
| 2017/0307301 A1* | 10/2017 | Sorensen | F28F 27/02 |
| 2018/0038513 A1* | 2/2018 | Baldea | B01J 19/0093 |
| 2018/0100676 A1* | 4/2018 | Stitou | F25B 17/08 |

* cited by examiner

TEMPERATURE CALIBRATION SYSTEM COMPRISING A VALVE IN A CLOSED FLUIDIC SYSTEM

BACKGROUND

Technical Field

Embodiments are directed to a temperature calibration system that utilizes a closed fluidic system, such as a thermosiphon or heat pipe.

Description of the Related Art

Many temperature calibration systems utilize a closed fluidic system for removing heat from a calibration unit. Typically, the closed fluidic system is a thermosiphon (or a heat pipe) that transfers fluid in the closed system between a liquid state and a vapor state. Thermosiphons may further be coupled to a cooling assembly to aid in removing heat from the calibration unit. In general, thermosiphons and cooling assemblies perform well when operating at cold temperatures that are below ambient but are limited when operating at higher temperatures, such as temperatures above ambient. At these higher temperatures, pressure in the system can cause damage to the cooling assemblies used to cool the thermosiphon.

To prevent damage to the cooling assembly, some existing temperature calibration systems have limited the upper temperature limit of the operating ranges of the system. Other temperature calibration systems utilize an expansion tank that is in fluid communication with a condenser of the thermosiphon. As fluid in the thermosiphon rises above a threshold temperature, fluid in a gas state migrates through a port at an upper end of the condenser to the expansion tank, which is located below the condenser. When temperatures in the condenser reduce, the gas migrates back to the condenser and the thermosiphon continues to operate as usual. Alternative solutions, however, are desired.

BRIEF SUMMARY

Embodiments described herein are directed to a temperature calibration system that includes a closed fluidic system, such as a thermosiphon or a heat pipe. The closed fluidic system includes a valve for fluidly separating components therein from each other. In one embodiment, the closed fluidic system is a thermosiphon (or heat pipe) and the valve is configured, in a closed state, to cover a port of the condenser to fluidly separate the condenser from other components of the thermosiphon. The valve may be a passively activated valve or an actively actuated valve (e.g., an electrically actuated valve). In some embodiments, the valve is thermally actuated such that the valve changes state in response to changes in temperature.

In one embodiment is directed to a temperature calibration system comprising a calibration unit configured to receive one or more device elements to be calibrated. The temperature calibration system further includes a closed fluidic system configured to remove heat from the calibration unit. The closed fluidic system includes a condenser, an evaporator, and a valve. The valve is configured to fluidly decouple the condenser from the evaporator in a closed state and to fluidly couple the condenser to the evaporator in an open state.

Another embodiment is directed to a temperature calibration system comprising a calibration unit, an evaporator on the calibration unit, and a condenser. The evaporator has a port and the condenser has a port. The temperature calibration system further includes a connecting tube having a first end coupled to the port of the evaporator and a second end coupled to the port of the condenser. A valve is located in the condenser. The valve is configured to move between an open state that fluidly couples the condenser with the connecting tube and a closed state that fluidly decouples the condenser from the connecting tube. The temperature calibration system further includes a cooling assembly coupled to the condenser.

Another embodiment is directed to a method comprising heating a calibration unit and using a thermosiphon or heat pipe to remove heat from the calibration unit. The thermosiphon or heat pipe includes a condenser and an evaporator. The method further includes in response to an increase in temperature above a threshold, fluidly decoupling the condenser from the evaporator.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that implementations may be practiced without one or more of these specific details, or with other methods, components, materials, etc. In other instances, well-known structures of the temperature calibration systems have not been shown or described in detail to avoid unnecessarily obscuring descriptions of the embodiments.

Embodiments are directed to a temperature calibration system that includes a closed fluidic system, such as a thermosiphon or a heat pipe. The closed fluidic system includes a valve for fluidly separating components therein from each other. In one embodiment, the closed fluidic system is a thermosiphon (or heat pipe) and the valve is configured, in a closed state, to cover a port of the condenser to fluidly separate the condenser from other components of the thermosiphon. The valve may be a passively activated valve or an actively actuated valve (e.g., an electrically actuated valve). In some embodiments, the valve is thermally actuated such that the valve changes state in response to changes in temperature.

FIGS. 1A-1D show a temperature calibration system 100 in accordance with one embodiment. The temperature calibration system 100 includes a calibration unit 102 that provides a chamber with a controlled temperature over a temperature range. The temperature calibration system 100 includes a heat source 152 (FIG. 5) for heating the calibration unit 102 and a closed fluidic system, such as a thermosiphon 104 or heat pipe, for removing heat from the calibration unit 102.

Figure 1A:
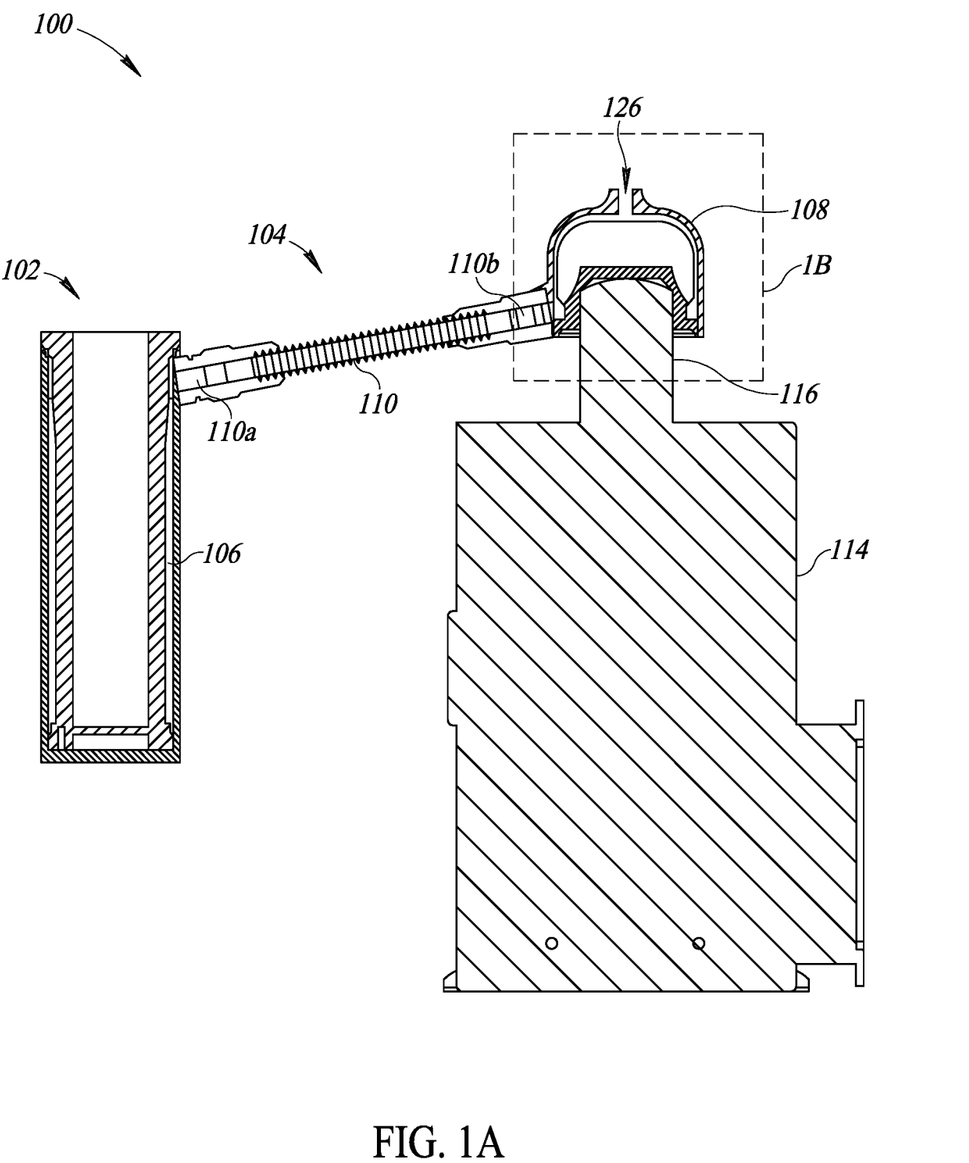
FIG. 1A is a schematic illustration of a temperature calibration system in accordance with one embodiment.

In some embodiments, the calibration unit 102 is a dry block assembly that includes a thermally conductive material, such as a metal, and includes one or more openings for receiving one or more device elements to be calibrated, such as probes or thermometers. In other embodiments, the calibration unit 102 includes a liquid bath that is heated by the heat source.

Figure 5:
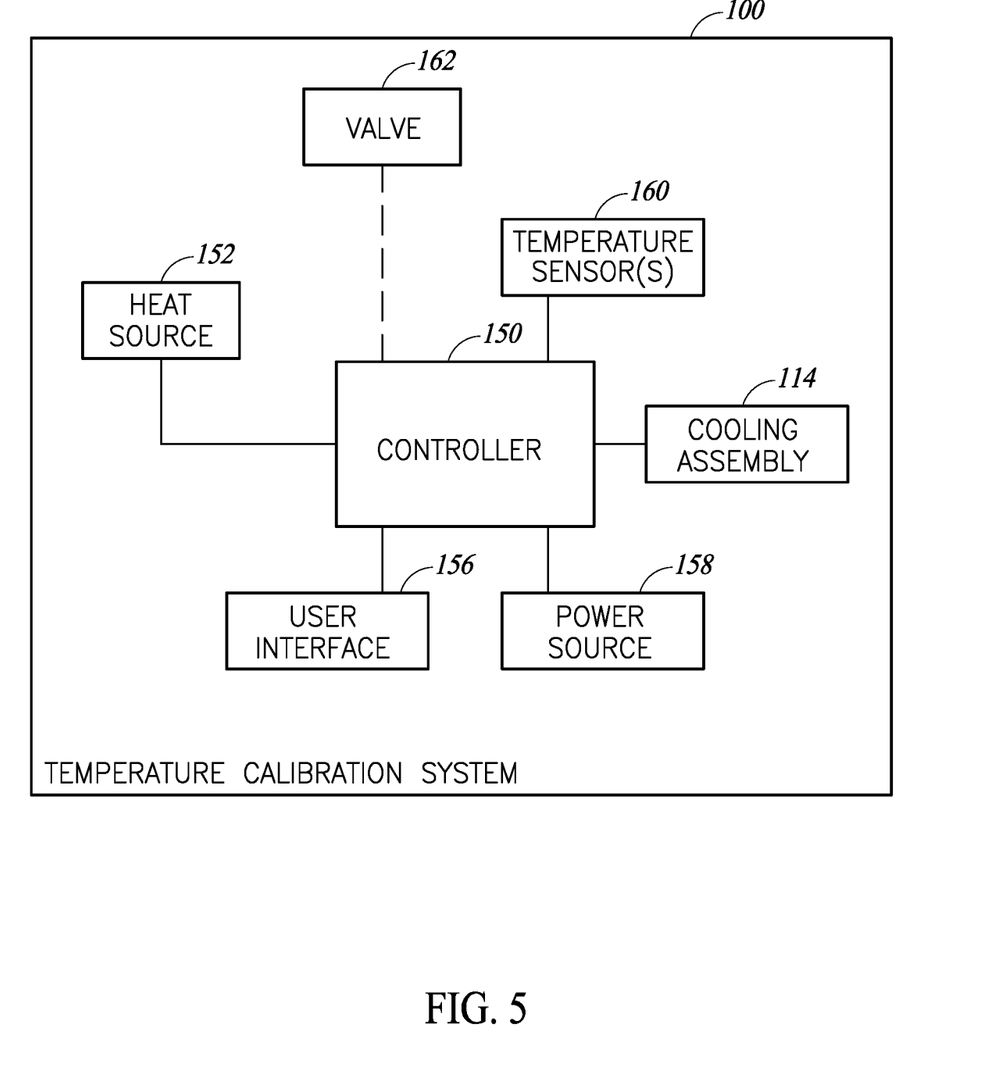
FIG. 5 is a block diagram illustrating some of the electrical components of the temperature calibration system of FIG. 1A.

The heat source 152 is any heat source configured to heat the calibration unit 102. In some embodiments, the heat sources may be Peltier elements, electrodes, cartridge heaters, or any other suitable heater(s) configured to heat the calibration unit 102.

Heat is transferred away from the calibration unit 102 by the thermosiphon 104. The thermosiphon 104 includes an evaporator 106 that is located at the calibration unit 102, a condenser 108 that is separated from the calibration unit 102, and a connecting tube 110 that places the evaporator 106 in fluid communication with the condenser 108. In particular, a first end 110a of the connecting tube 110 is coupled to a port of the evaporator 106 at the calibration unit 102, and a second end 110b of the connecting tube 110 is coupled to a port 122 of the condenser 108 (see FIG. 1B). The evaporator 106, the condenser 108, and the connecting tube 110 together are a closed system containing a fluid therein. The evaporator 106 is configured to allow heat in the calibration unit 102 to transfer to the fluid, which is in a liquid form, and to cause the heated liquid to evaporate into gas. The condenser 108 is configured to cool the fluid in the gas form to cause the fluid to condense into a liquid form. The fluid in the various forms moves through the connecting tube 110 between the evaporator 106 and the condenser 108. The fluid may be any fluid or refrigerant, including water, acetone, methanol, or any other suitable fluid.

To aid the condenser 108 in cooling the fluid, the temperature calibration system 100 further includes a cooling assembly 114 that is coupled to the condenser 108. The cooling assembly 114 acts as a heat sink to remove heat from the condenser 108 to aid the condenser 108 in converting the fluid in gas form therein into liquid form. The cooling assembly 114 in the illustrated embodiment is a Stirling cooler and includes a cooling head 116 that is thermally coupled to the condenser 108. The heat transfers from the condenser 108 to the cooling head 116 and through the remaining parts of the cooling assembly 114.

Figure 1B:
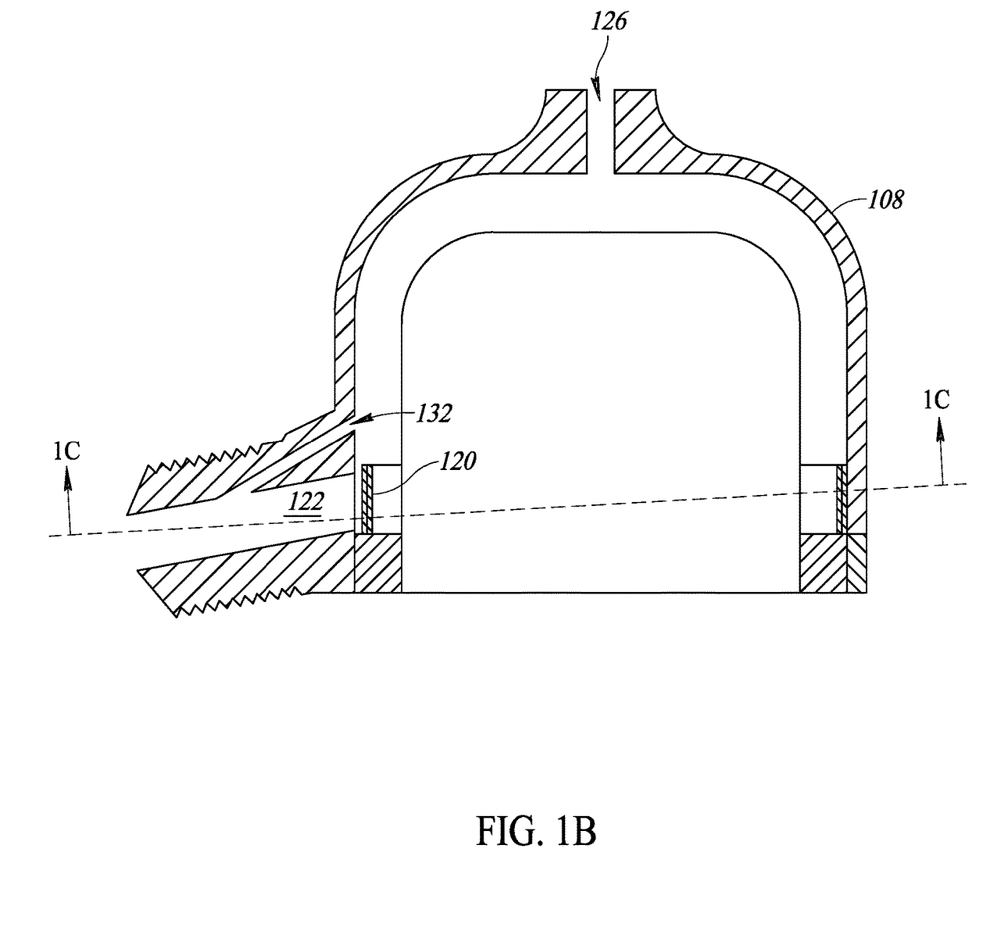
FIG. 1B is a close-up view of a portion of a thermosiphon in the temperature calibration system of FIG. 1A in accordance with one embodiment.
Figure 1C:
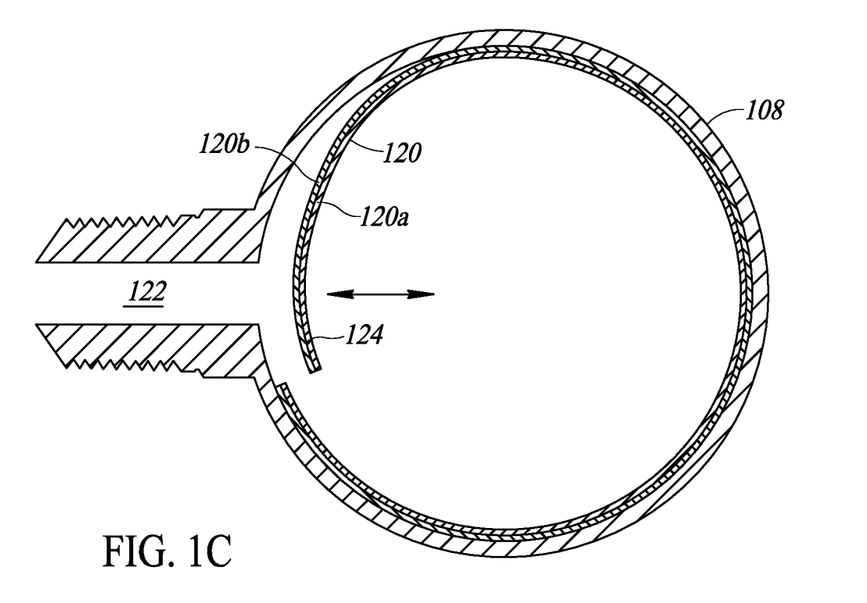
FIGS. 1C and 1D are cross-section views of the portion of the thermosiphon of FIG. 1B with a valve in an open state and a closed state, respectively.
Figure 1D:
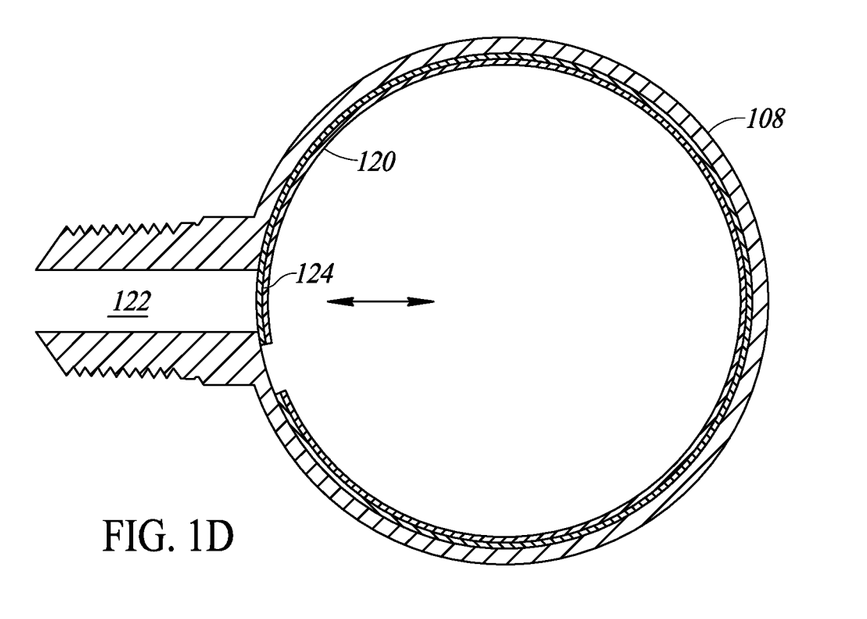

As best shown in FIGS. 1B-1D, the thermosiphon 104 includes a valve 120 that fluidly couples and decouples the condenser 108 from the rest of the thermosiphon 104. In the illustrated embodiment, the valve 120 is located inside the condenser 108 and is configured to fluidly close or open a port 122 of the condenser 108 at the second end 110b of the connecting tube 110.

In the illustrated embodiment, the valve 120 is a bi-material strip of two thermally conductive materials coupled together such that a first thermally conductive material is provided on an inner side 120a and a second thermally conductive material is provided on an outer side 120b. The two materials have different coefficients of thermal expansion (CTE), and thus expand and contract at different rates and temperatures to cause the valve 120 to change states from the open state to the closed state. In at least one embodiment, the first thermally conductive material at the inner side 120a has a CTE that is greater than the CTE of the second thermally conductive material at the outer side.

The bi-material strip that forms the valve 120 has a circumferential shape that includes a first portion that rests on the inner wall of the condenser 108. A second end 124 of the bi-material strip moves radially in the directions indicated by the arrows between an open state, as shown in FIGS. 1B and 1C, in which the fluid, in either the liquid or gas state, can move between the connecting tube 110 and the condenser 108, and a closed state, as shown in FIG. 1D, in which the fluid is blocked from moving between the connecting tube 110 and the condenser 108. In particular, in the open state, the movable end 124 coils inward as shown in FIG. 1C, and in the closed state, the movable end 124 rests against the inner wall of the condenser 108 surrounding the port 122 of the condenser 108, as shown in FIG. 1D.

In at least one embodiment, the valve 120 is a passive valve that changes state in response to being exposed to environmental temperature changes, such as in response to changes in temperature in the condenser 108. For instance, as the temperature in the condenser 108 increases to a threshold, the bi-material strip increases in temperature to cause the materials forming the bi-material strip to expand such that the movable end 124 uncoils so that the movable end 124 presses against the inner surface of the condenser 108 over the port 122, thereby fluidly separating the condenser 108 from the rest of the thermosiphon 104. As the temperature in the condenser 108 decreases below the threshold, the bi-material strip decreases in temperature to cause the materials forming the bi-material strip to contract such that the movable end 124 coils to a position as shown in FIG. 1C, thereby uncovering the port 122 and fluidly coupling the condenser 108 with the rest of the thermosiphon 104.

In operation of the temperature calibration system 100, the heat source heats the calibration unit 102, which heats the fluid in the evaporator 106 of the thermosiphon 104, thereby causing the fluid to vaporize. The vaporized fluid rises and travels, in vapor form, from the evaporator 106 through the connecting tube 110 into the condenser 108. In the condenser 108, the vaporized fluid is cooled and condensed into liquid form. In the liquid form, the fluid travels with gravity through the connecting tube 110 to the evaporator 106 at the calibration unit 102. The calibration unit 102 may again heat the liquid in the evaporator 106, turning the liquid back into the vapor form, which again is provided back to the condenser 108 through the connecting tube 110. The cycle continues until a desired temperature of the calibration unit 102 is achieved and held.

In the event the temperature calibration system 100 is operating at elevated temperatures, such as temperatures above ambient, the cooling assembly 114, such as a Stirling cooler, has limited heat sink abilities, thereby limiting the amount the cooling assembly aids in cooling the vaporized fluid in the condenser 108. Furthermore, components of the cooling assembly (in the illustrated embodiment, the Stirling cooler) can be damaged by the elevated temperatures, such as temperatures at or above 50° C. In particular, the increased temperatures result in increased pressure, which can cause fatigue and failure of various components of the Stirling cooler.

As the temperature increases above a predetermined threshold value, such as 50° C., the bi-material strip of the valve 120 is constructed such that the movable end 124 of the bi-material strip expands and radially moves into the closed state and decouples the condenser 108 from the rest of the thermosiphon 104, as shown in FIG. 1D. In response to the temperature inside the condenser 108 decreasing below the predetermined threshold value, the movable end 124 of the bi-material strip of the valve 120 retracts and moves radially into the open state, as shown in FIG. 1C.

By providing a valve 120 in the thermosiphon 104 that fluidly isolates the condenser 108 from the rest of the thermosiphon 104 when the thermosiphon 104 is operating at elevated temperatures, the temperature that the cooling assembly 114 is exposed to is thereby limited. Thus, the cooling assembly 114 may be protected from damage caused by high temperatures of the thermosiphon. When the temperature of the thermosiphon, such as inside of the condenser, decreases below a predetermined threshold, the valve opens to thereby place the condenser in fluid communication with the rest of the thermosiphon.

In at least one embodiment, the natural state for the bi-material strip at ambient temperature is the closed state, as shown in FIG. 1D. As temperatures in the condenser go below ambient, the bi-material strip coils into the open state, as shown in FIG. 1C. Thus, as temperatures increase to ambient, the valve 120 closes, thereby preventing the cooling assembly from being exposed to temperatures at or above ambient.

The bi-material strip may include more than two materials so long as at least two of the materials are thermally conductive materials having suitably different CTEs that cause the valve 120 to open and close at desired temperatures. For instance, in one embodiment the first material may be stainless steel and the second material may be copper, which may be formed by press heating the first and second materials together. The size and shape of the bi-material strip may vary, depending on the materials being used for the bi-material strip and the temperatures at which the valve 120 is to open and close.

In another embodiment, the valve 120 is a bi-material strip that is electrically actuated, rather than passively actuated as described above. In this embodiment, the bi-material strip is electrically coupled to an actuation device, such as a controller, that is configured to electrically activate the bi-material strip. For instance, a current may be applied to the bi-material strip that heats the bi-material strip to a particular temperature that would cause the bi-material strip to expand and cover the port 122 of the condenser 108. The electrically actuated bi-material strip may then be used in systems that use fluids in various temperature ranges, such as those that would not cause passive activation of the bi-material strip.

As shown in FIG. 1B, the temperature calibration system 100 may include a pressure equalization port 132 that maintains fluid communication between the condenser 108 and the rest of the thermosiphon 104 for the purpose of maintaining an equalized pressure within the fluidic system. Thus, even though the valve 120 is in the closed state, as shown in FIG. 1D, the pressure equalization port 132 allows some fluid communication between the condenser 108 and the rest of the thermosiphon 104 but is primarily for the purpose of reducing built up pressure within the fluidic system, particularly pressure that builds up in the rest of the thermosiphon 104.

The temperature calibration system 100 may further include a port 126 at the top of the condenser 108. The port 126 may be used to refill the fluid in the system. During operation, the port 126 is closed or may be coupled to an expansion tank (not shown) that allows the gas to migrate through the port 126 to the expansion tank, which is located below the condenser 108. When temperature in the condenser 108 reduces, the gas migrates back to the condenser 108 and the thermosiphon 104 continues to operate as usual.

Figure 2A:
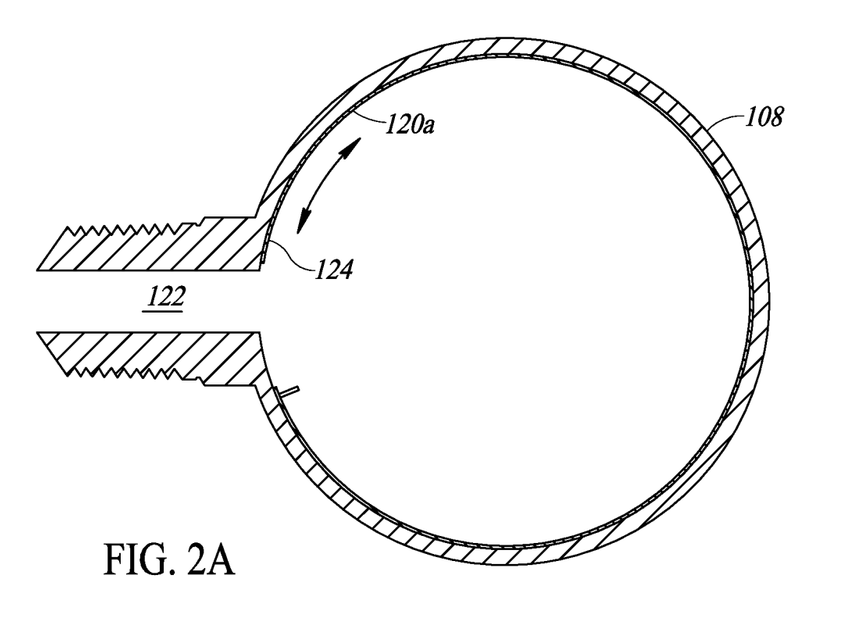
FIGS. 2A and 2B are cross-section views of a portion of a thermosiphon with a valve in accordance with another embodiment.
Figure 2B:
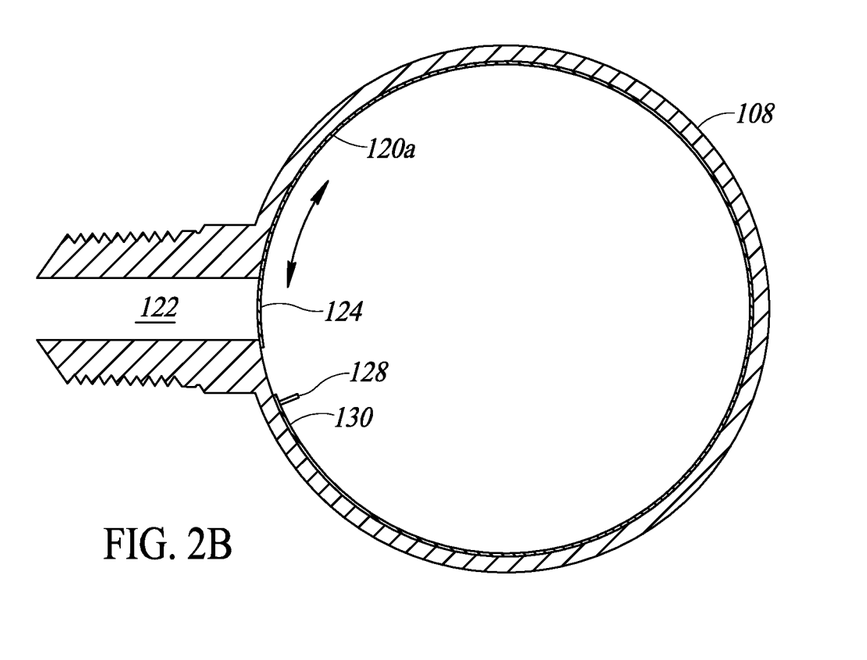

FIGS. 2A and 2B show a valve 120*a* in accordance with another embodiment, for use in a temperature calibration system such as the temperature calibration system 100 of FIG. 1A.

The valve 120*a* is a strip that is made from a single material or alloy. The strip is circumferentially shaped and extends substantially around and abuts the inner surface of the condenser 108. A fixed end 130 of the single strip is fixed to the inner surface of the condenser 108 by a fixing element, such as by a pin 128, a screw, an adhesive, or any other suitable fixing structure. The movable end 124 of the valve 120*a* is opposite the fixed end 130, and is configured to move in directions indicated by the arrows in FIGS. 2A and 2B in response to the material expanding and contracting due to changes in temperature. That is, in response to the temperature increasing to a threshold, the single strip valve 120*a* expands until the movable end 124 covers the port 122 of the condenser 108 to the closed position, as shown in FIG. 2B. As the temperature decreases to below a threshold value, the single strip valve 120*a* contracts until the movable end 124 moves away from the port 122 of the condenser 108 to the opened position, as shown in FIG. 2A. In at least one embodiment, the single strip material is made from copper or a copper alloy. The single strip may also be electrically actuated in a similar manner as discussed above in reference to the bi-material strip of valve 120.

Figure 3A:
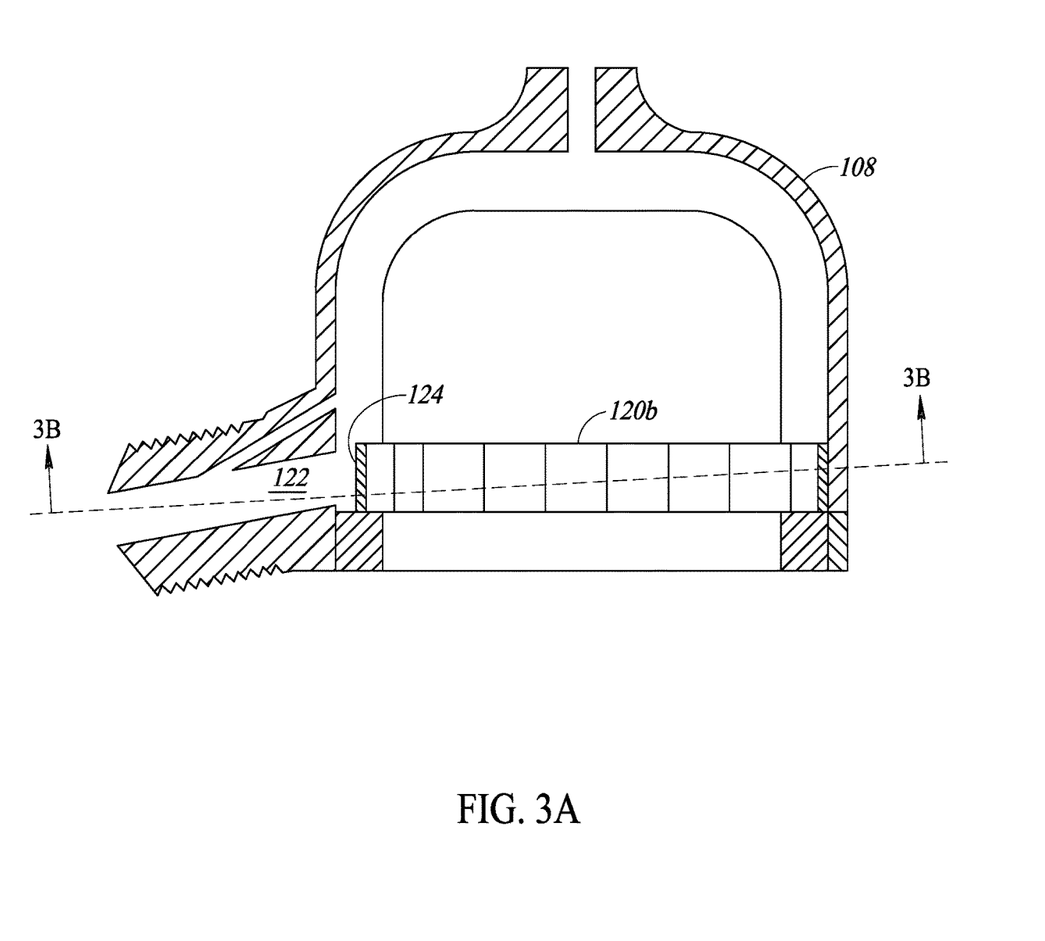
FIG. 3A is a close-up view of a portion of a thermosiphon with a valve in accordance with another embodiment.
Figure 3B:
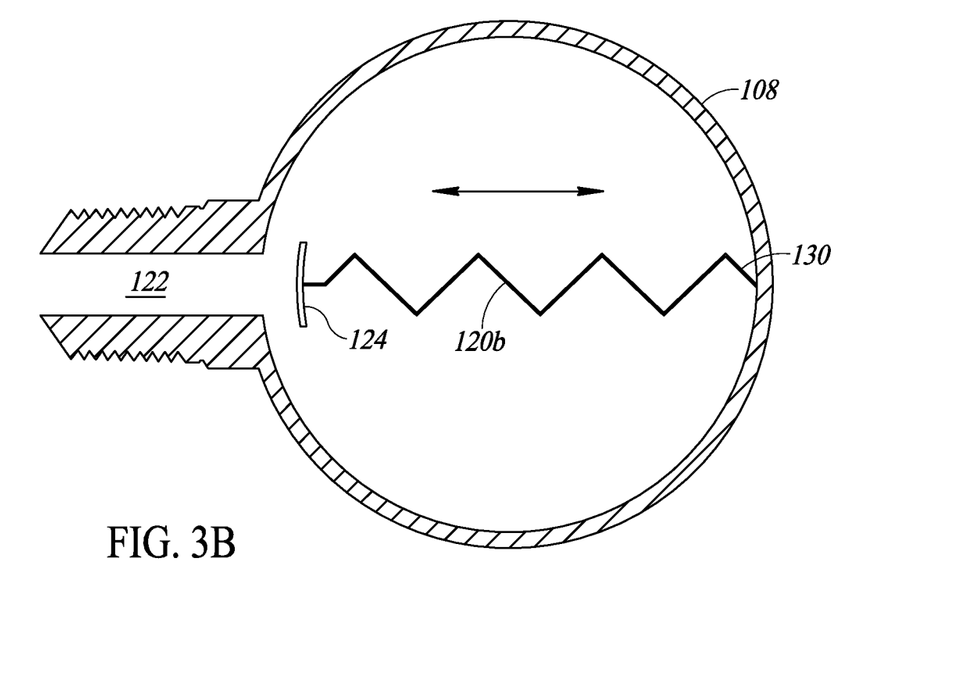
FIGS. 3B and 3C are cross-section views of the portion of the thermosiphon of FIG. 3A with the valve in an open state and a closed state, respectively.
Figure 3C:
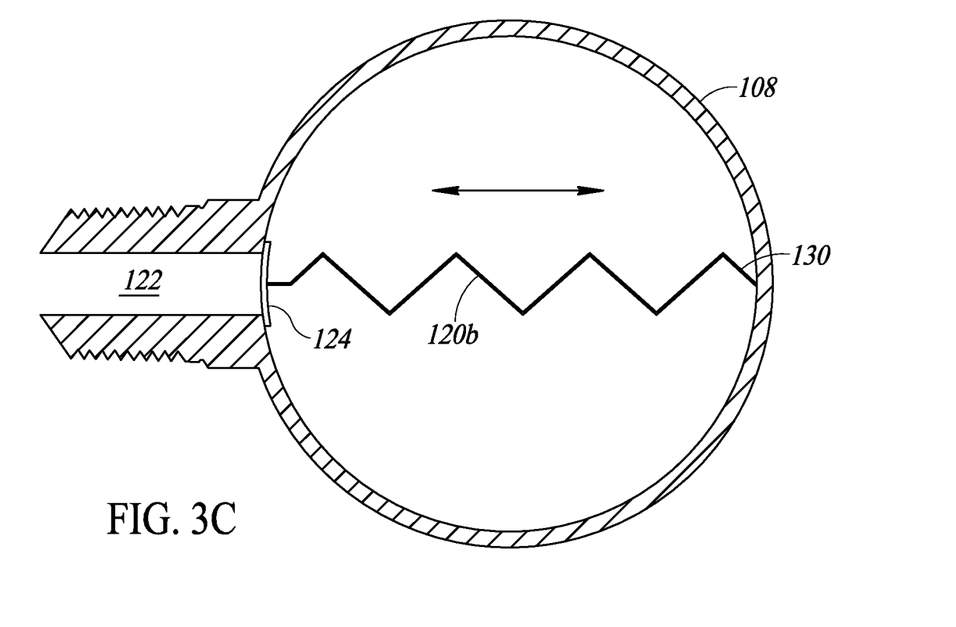

FIGS. 3A-3C show a valve 120*b* in accordance with another embodiment, for use in a temperature calibration system such as the temperature calibration system 100 of FIG. 1A. The valve 120*b* of FIGS. 3A-3C is substantially similar in function and structure to the valve 120*a* shown in FIGS. 2A and 2B, and thus only the differences will be described.

The valve 120*b* of FIGS. 3A-3C is a folded strip that has concertina folds or zig-zag folds, as best shown in FIGS. 3B and 3C. The fixed end 130 of the folded strip is fixed to the inner surface of the condenser 108 opposite the port 122 of the condenser 108 and the movable end 124 has an end portion that is suitably sized to cover the port 122. The folded strip moves axially in the directions indicated by the arrows. That is, the folded strip expands to a closed state, as shown in FIG. 3C, and retracts to an open state, as shown in FIG. 3B.

The folded strip may be actuated passively or actively as discussed above. In particular, the folded strip axially expands in response to increasing to a temperature that causes the movable end 124 of the folded strip to abut the condenser 108 covering the port 122 and thereby placing the valve 120*b* in the closed state, as shown in FIG. 3C. In response to decreasing in temperature, the folded strip axially contracts, causing the movable end 124 of the folded strip to retract from the port 122 and thereby placing the valve in the open state, as shown in FIG. 3B. In the embodiment in which the valve is actively actuated, the folded strip expands in response to current or voltage being applied to the strip.

The folded strip may be a single material, alloy, or plurality of materials. In at least one embodiment, the folded strip is a metal material, such as copper. The dimensions of the folded strip, such as length and thickness, depend on the material(s) or alloy(s) used for the folded strip. Although the movable end 124 is shown as a flat plate, the movable end 124 may any suitable shape the covers the port 122 of the condenser 108, such as a sphere, rectangular block, etc. Additionally, in some embodiments, the condenser 108 may include one or more guides that help maintain the position of the movable end 124 relative to the port 122 to ensure that expansion of the valve 120*b* suitably causes the movable end 124 to cover the port 122.

Figure 4A:
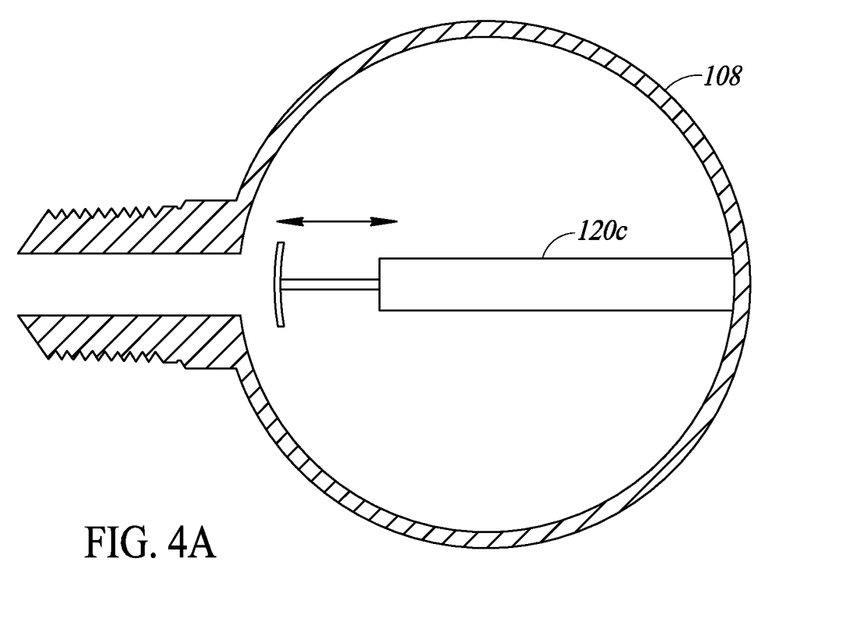
FIGS. 4A and 4B are cross-section views of a portion of a thermosiphon with a valve in accordance with another embodiment in an open state and a closed state, respectively.
Figure 4B:
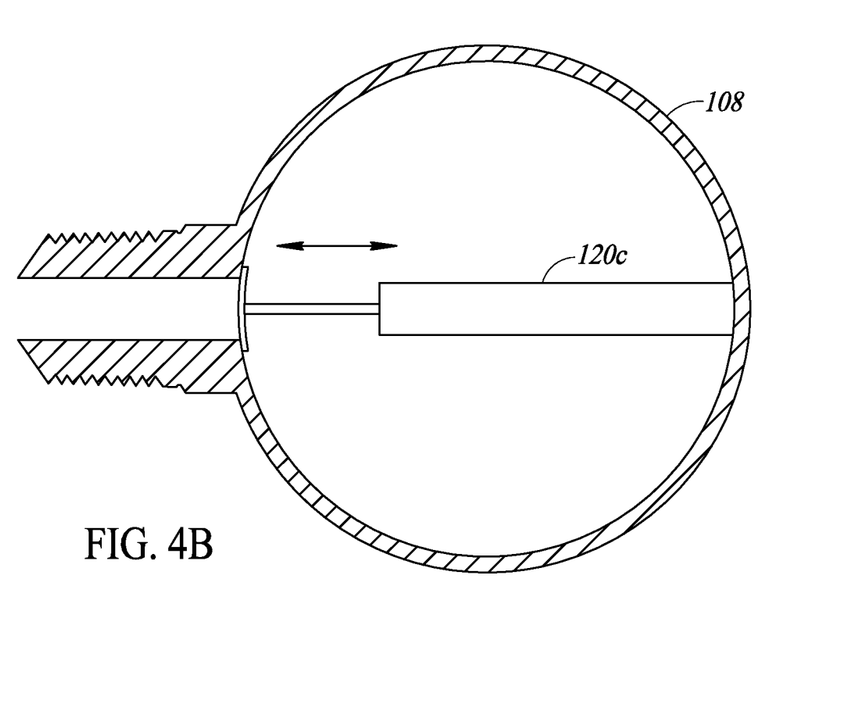

FIGS. 4A and 4B show a valve 120*c* in accordance with another embodiment, for use in a temperature calibration system such as the temperature calibration system 100 of FIG. 1A. The valve 120*c* of FIGS. 4A and 4B is a solenoid valve that is electrically actuated. In particular, the valve 120*c* is activated by receiving electrical signals from an actuation device, such as a controller. In the illustrated embodiments, the valve 120*c* is located inside the condenser 108. However, in other embodiments, the valve 120*c* may be external to the condenser 108, such as in the connecting tube 110 of the thermosiphon 104 proximate the port 122 of the condenser 108.

By having a valve configured to fluidly decouple the condenser 108 from the evaporator 106 of the thermosiphon 104, components of the temperature calibration system 100 may be protected from high temperatures and pressures that can cause damage. Thus, the temperature calibration system 100 can withstand higher operating temperatures than temperature calibration systems that are otherwise known. While the valve 120*c* depicted in FIGS. 4A and 4B includes an end that radially extends from a solenoid base to cover the port 122, other suitable configurations of the valve 120*c* may include an end that extends circumferentially from the solenoid base to cover the port 122.

FIG. 5 is a block diagram illustrating some of the electrical components of the temperature calibration system 100 in accordance with at least one embodiment. The temperature calibration system 100 includes a controller 150 coupled to a heat source 152, a cooling assembly 114, a user interface 156, a power source 158, and at least one temperature sensor 160. The temperature calibration system 100 may further include an electrically actuated valve 162 that is coupled to the controller 150. The electrically actuated valve 162 may be any of the valves described herein, including valves 120, 120*a*, 120*b*, and 120*c*. The user interface 156 may include various inputs such as a touchscreen display, keyboard, knobs and buttons that allow a user to interact with the controller 150, and outputs, such as a display and lights, for communicating with the user. For instance, the user may input a desired temperature for the calibration unit 102, which is provided to the controller 150.

The controller 150, which may be a microprocessor or other programmed or wired circuitry, includes suitable circuitry and logic for performing various functions during the operation of the temperature calibration system 100. The controller 150 is configured to activate and deactivate the heat source 152, the cooling assembly 114, and the electrically actuated valve 162. In response to receiving the desired temperature from the user interface, the controller 150 may send a signal to the heat source 152 to activate the heat source 152. A temperature sensor 160 is configured to provide a temperature signal to the controller 150. In at least one embodiment, the temperature sensor 160 is located inside of the thermosiphon 104, such as in the condenser 108, and is configured to sense the temperature within the thermosiphon 104 or condenser 108.

The controller 150 is configured to compare the sensed temperature to one or more thresholds. In response to sensing a temperature that is above a first threshold, the controller 150 may activate the cooling assembly 114. In response to sensing a temperature that is above a second threshold, controller 150 may close the valve 162 to fluidly decouple the condenser 108 from the rest of the thermosiphon 104. In particular, the controller 150 includes suitable circuitry and logic to provide a signal to the electrically activated valve 162 that causes the valve 162 to move from the open state to the closed state, thereby fluidly decoupling the condenser 108 from the rest of the thermosiphon 104. The second threshold may be a temperature that is less than a temperature that would otherwise damage a component of the cooling assembly 114, which may be a Stirling cooler. In at least one embodiment, the second threshold is between 50° C. and 60° C.

Upon the cooling assembly 114 cooling the condenser 108, the controller 150 may receive a temperature signal and determine that the sensed temperature is below the second threshold. In response, the controller 150 is configured to provide a second signal to the electronic valve 162 to cause the valve 162 to move from the closed state to the open state, thereby fluidly coupling the condenser 108 to the rest of the thermosiphon 104. In other embodiments, the threshold used to open the electrically activated valve 162 may be different than the threshold used to close the electrically activated valve 162.

The power source, which can be a battery or a plug for coupling to a main power supply, provides power for operating the temperature calibration system.

While the foregoing description illustrates and describes valves located inside the condenser, it should be understood that the valves may be located in other locations within the closed fluidic system. For instance, the valve may be located anywhere in the connecting tube, such as in the connecting tube proximate the condenser.

Although not described with each embodiment, it is to be appreciated that valves may have a natural state that places the valve in the closed state. Thus, in the event that power is not provided to the temperature calibration system, the condenser is fluidly separated from the rest of the thermosiphon. Furthermore, any of the passively actuated valves may be electrically actuated instead. In that regard, any of the passively actuated valves may be used to operate at different environmental temperatures within the closed system than would activate the valves based on the material properties of the material(s) that make up the valve.

Although a thermosiphon is described in the exemplary embodiments provided herein, a person of ordinary skill in the art understands any reference to a thermosiphon in accordance with the present disclosure may also apply to a heat pipe.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A temperature calibration system comprising:
   a temperature calibration unit configured to receive one or more device elements to be calibrated; and
   a closed fluidic system configured to remove heat from the temperature calibration unit, the closed fluidic system including a condenser and an evaporator, the closed fluidic system including a valve configured to fluidly decouple the condenser from the evaporator in a closed state and to fluidly couple the condenser to the evaporator in an open state.

2. The temperature calibration system of claim 1, wherein the valve is located inside of the condenser and configured to cover a port of the condenser in the closed state.

3. The temperature calibration system of claim 1, wherein the valve is a passive valve that expands and contracts to move between the closed state and the open state in response to changes in temperature.

4. The temperature calibration system of claim 3, wherein the valve is a bi-material strip that includes a first material coupled to a second material, the first material having a different coefficient of thermal expansion than the second material.

5. The temperature calibration system of claim 4, wherein the bi-material strip has a movable end that moves radially between the open state and the closed state.

6. The temperature calibration system of claim 3, wherein the valve has a first end that is fixed to an inner surface of the condenser and a second end that is configured to expand and contract to place the valve in the closed state and the open state, respectively.

7. The temperature calibration system of claim 1, wherein the valve is configured to be actuated in response to receiving an electrical signal.

8. The temperature calibration system of claim 1, further comprising a stirling cooler coupled to the condenser of the closed fluidic system, the stirling cooler being configured to cool the condenser, wherein the valve is configured to fluidly decouple the condenser from the evaporator in the closed state to limit a temperature of the condenser and thereby protect the stirling cooler.

9. A temperature calibration system comprising:
   a temperature calibration unit;
   an evaporator on the temperature calibration unit, the evaporator having a port;
   a condenser having a port;
   a connecting tube having a first end coupled to the port of the evaporator and a second end coupled to the port of the condenser;
   a valve located in the condenser, the valve being configured to move between an open state that fluidly couples the condenser with the connecting tube, and a closed state that fluidly decouples the condenser from the connecting tube; and
   a cooling assembly coupled to the condenser, wherein the valve is configured to fluidly decouple the condenser from the evaporator in the closed state to limit a temperature of the condenser and thereby protect the cooling assembly.

10. The temperature calibration system of claim 9, wherein the valve moves between the open state and the closed state in response to changes in temperature that cause a portion of the valve to move between the open state and closed state.

11. The temperature calibration system of claim 9, wherein the valve is a strip located around an inner surface of the condenser, the strip including a movable end that when in the closed state covers the port of the condenser.

12. The temperature calibration system of claim 11, wherein the movable end of the strip is curled inward and spaced from the inner surface of the condenser in the open state.

13. The temperature calibration system of claim 11, wherein the movable end of the strip abuts the inner surface of the condenser in the open state.

14. The temperature calibration system of claim 9, wherein the valve includes at least one thermally conductive material that includes a first end fixed to the condenser and a movable end that is movable and is configured to move the valve between the open state and the closed state in response to temperature changes inside of the condenser.

15. A method comprising:
    heating a temperature calibration unit;
    using a thermosiphon or heat pipe to remove heat from the temperature calibration unit, the thermosiphon or heat pipe including a condenser and an evaporator;
    using a stirling cooler to remove heat from the condenser; and
    in response to the condenser increasing in temperature above a threshold, fluidly decoupling the condenser from the evaporator in order to prevent damage to the stirling cooler.

16. The method of claim 15, wherein fluidly decoupling the condenser from the evaporator comprises closing a valve at a port of the condenser to fluidly decouple the condenser from the evaporator.

17. The method of claim 16, wherein fluidly decoupling the condenser from the evaporator comprises thermally expanding a material to cause a port of the condenser to be fluidly decoupled from the evaporator.

18. The method of claim 15, wherein fluidly decoupling the condenser from the evaporator comprises providing an electrical signal to a valve to cause the valve to fluidly decouple the condenser from the evaporator.

19. The method of claim 16, wherein the valve moves radially, circumferentially, or linearly in response to receiving the electrical signal.

20. The method of claim 16, further comprising in response to a decrease in temperature below the threshold, fluidly coupling the condenser to the evaporator.

21. The method of claim 16, wherein fluidly decoupling the condenser from the evaporator includes maintaining pressure relief between the condenser and the evaporator.

22. The temperature calibration system of claim 9, comprising a pressure equalization port that is open when the valve is in the closed state.

23. The temperature calibration system of claim 22, wherein the pressure equalization port is configured to relieve pressure in the evaporator.

24. The temperature calibration system of claim 1, wherein the closed fluidic system includes a pressure equalization port that provides pressure relief for the evaporator.

* * * * *